Figure 1:
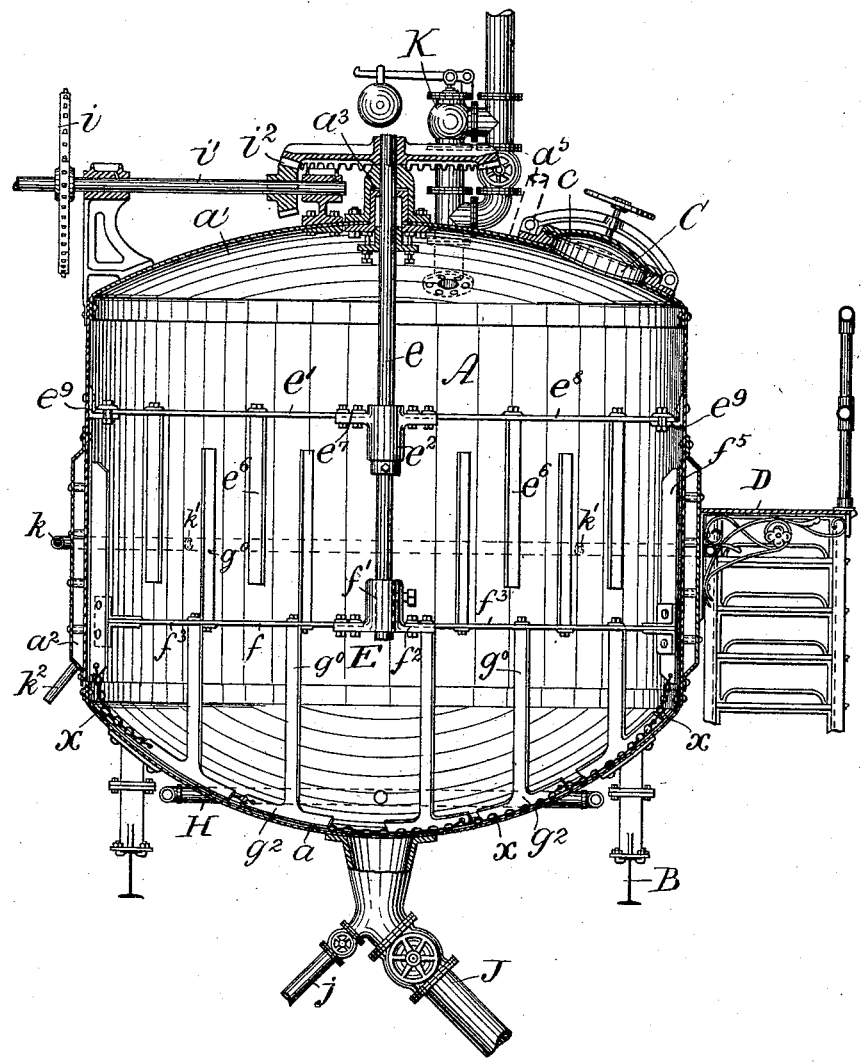

(No Model.)  3 Sheets—Sheet 1.

A. C. WAGNER.
MASHING APPARATUS.

No. 478,667. Patented July 12, 1892.

Witnesses:
Philip C. Ungewiss
Emil H. C. Hartmann

Inventor:
Adam C. Wagner
by Hermann Bormann
Att'y.

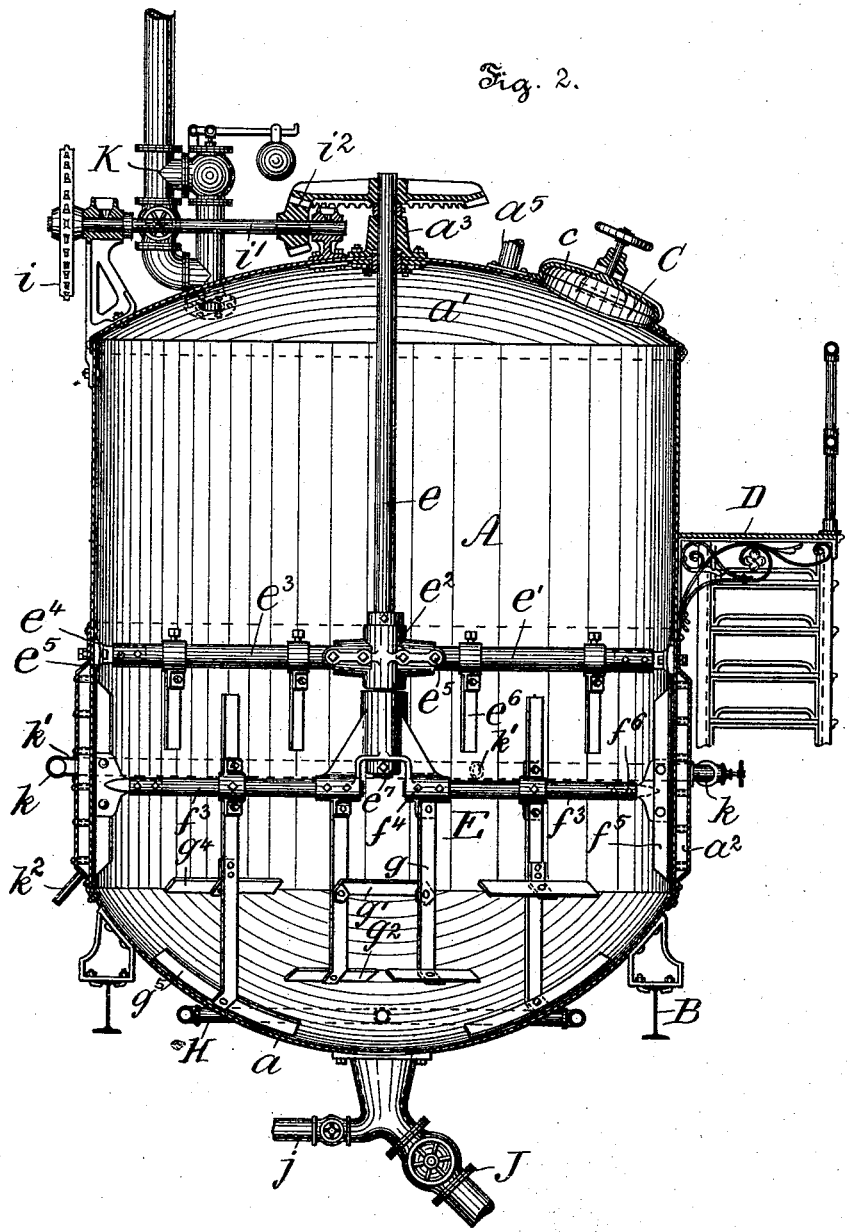

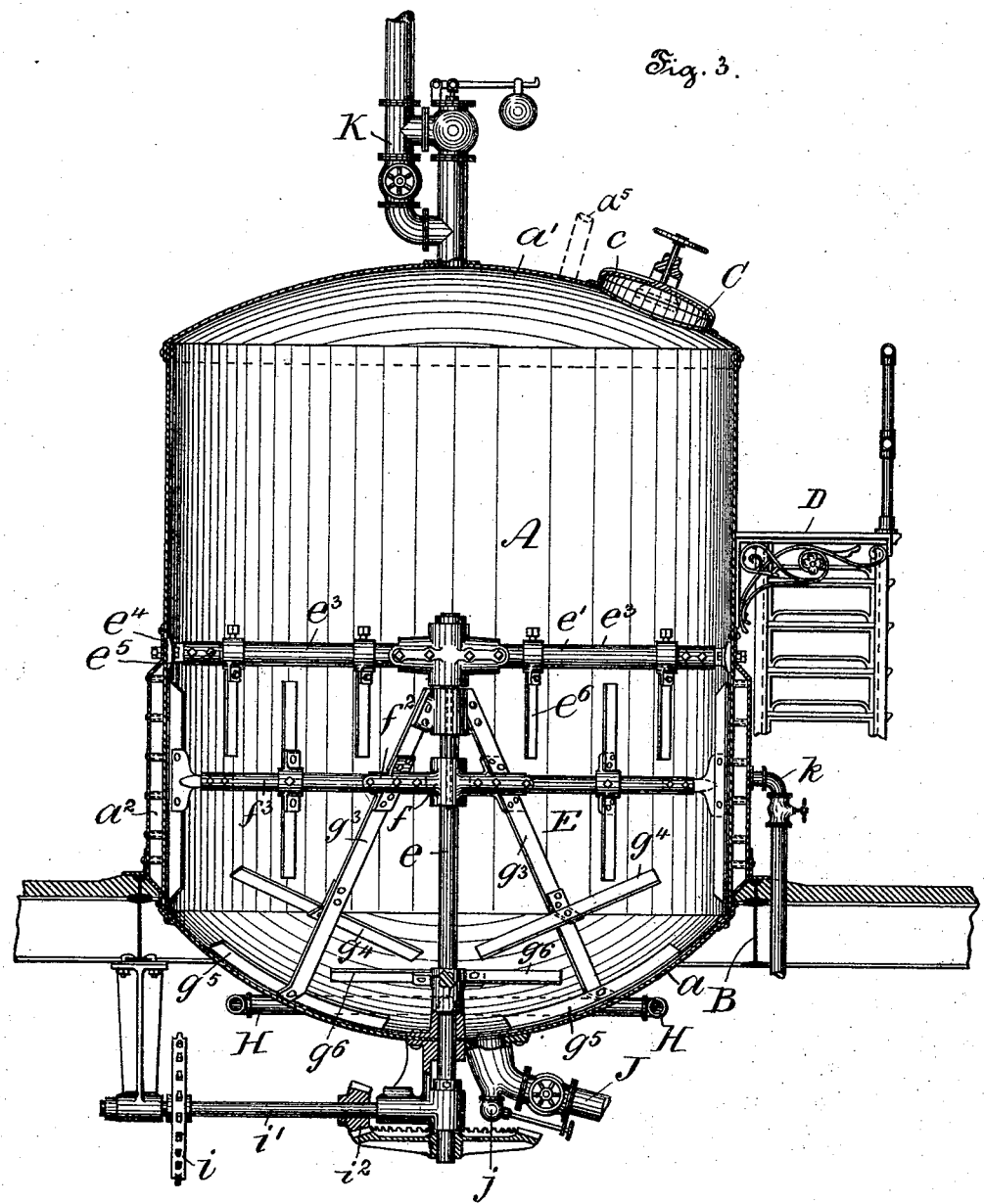

UNITED STATES PATENT OFFICE.

ADAM C. WAGNER, OF PHILADELPHIA, PENNSYLVANIA.

MASHING APPARATUS.

SPECIFICATION forming part of Letters Patent No. 478,667, dated July 12, 1892.

Application filed April 12, 1892. Serial No. 428,755. (No model.)

*To all whom it may concern:*

Be it known that I, ADAM C. WAGNER, a citizen of the United States, residing at Philadelphia, in the county of Philadelphia and State of Pennsylvania, have invented certain new and useful Improvements in Mashing Apparatus, of which the following is a specification.

My invention relates to mashing apparatus used in breweries for extracting the wort from malt or other ingredients used in the manufacture of liquors.

The object of my invention is to provide a simple and effective mashing apparatus by which the wort from malt and other ingredients is extracted in a rapid, thorough, and economical manner.

My invention consists of a mashing apparatus comprising a vessel of sheet metal having a concave or conical bottom, a steam-jacket above said bottom and surrounding the said vessel, and stationary and agitating or stirring arms within said vessel, the latter adapted to be rotated by a shaft extending into said vessel from one end thereof.

My invention further consists of a mash-vessel, a diametrical-disposed bar having stationary arms, a shaft having one of its ends journaled in said bar and the other journaled in a bearing located outside the vessel, and stirring or agitating bars or arms attached to said shaft.

My invention further consists of a mash-vessel and adjustable diametrical bar within the same, a shaft having one of its ends journaled in said bar and the other journaled in a bearing located outside of the vessel, agitating-arms adjustably secured to said shaft, and means for driving said shaft.

My invention further consists of a circular mash-vessel having a depressed bottom, a steam-jacket above said bottom and surrounding said mash-vessel, a shaft extending into the vessel and carrying a revolving arm having bars and scrapers, and chains attached to said scrapers or arms and adapted to drag behind the same and on the depressed bottom.

My invention further consists of the improvements hereinafter set forth, and pointed out in the claims.

The invention will be more fully understood taken in connection with the accompanying drawings, forming part hereof, in which—

Figure 1 is a central vertical section of a mashing apparatus embodying features of my invention and showing the vessel with steam-jacket and concave bottom, diametrically-disposed bar, shaft, agitating-arms, and the steam inlets and outlets for the vessel and jacket and the inlets and outlets for the wort or ingredients. Fig. 2 is a similar view of a somewhat modified form of mashing apparatus embodying features of the invention; and Fig. 3 is a similar view of a modified form of mashing apparatus having the driving-gears located underneath the bottom, and also showing a modified form of agitating device.

Referring now to the drawings for a further description of my invention and more particularly to Fig. 1, A is a mash-vessel provided with a concave bottom $a$, concave top $a'$, steam-jacket $a^2$, and agitating or stirring device E. This vessel A may be supported in any convenient manner by brackets, flanges, or other means resting upon I or other beams B. C is a manhole, which also serves as the inlet for the ingredients to be mashed or the wort to be extracted from, and to which access may be had by the staircase D. E is the agitating device, comprising the driving-shaft $e$, extending from the top of the vessel A into the same, and this shaft is journaled near its lower end in the diametrical-disposed bar $e'$ and at its upper end in a bearing $a^3$, bolted or otherwise fastened to the concave top $a'$. The cross-bar $e'$ consists of the cast centerpiece or journal $e^2$, having rabbeted supports $e^7$, into which ends of the flat iron bars $e^8$ are fitted and held by bolts. The opposite ends of these bars $e^8$ are supported by angles $e^9$, riveted or otherwise fastened to the wall of the vessel A. The free shanks of this angle are slotted, and the ends of the bars $e^8$ are held thereon by bolts inserted through the said slot to allow for adjustment of the bars $e^8$ with reference to the circumference of the vessel A. Onto this cross-bar $e'$ are bolted or otherwise secured depending arms $e^6$, and which are set at angle to the bar $e'$. A revolving bar $f$ is secured to the lower end of the shaft $e$, and consists of a hub $f'$, having rabbeted supports $f^2$, into which are fitted and secured the bars $f^3$, of flat iron. $f^5$ are scrapers adjustably or securely fastened to the respective ends of the bars $f^3$, constituting the revolving bar $f$, for a purpose to be described. Bars $g°$ are fastened to each side or the bars $f^3$ and extend above and below the said revolving bar $f$, and these bars $g°$ are arranged with respect to each other and the center of the revolving bar $f$ so that two or more bars $g°$ on one bar $f^3$ pass in arcs which are between the arcs described by the bars $g°$ on the other bar $f^3$, as will be readily understood from the drawings. Each of the depending bars $g°$ has attached to it a scraper $g^2$, which is situated in close proximity to the concave or, if preferred, the conical bottom $a$, to prevent any settlement or precipitation of malt or other ingredients from which the wort is to be extracted. Chains $x$ are also provided for this purpose, and are attached to the scrapers $f^5$ and $g^2$, so as to form a continuous chain extending diametrically across the bottom $a$, and are dragged along the same with and behind the scrapers $f^5$ and $g^2$. H is a steam-pipe for admitting steam at three equidistant points in the bottom directly into the vessel A. J is the offtake for the wort and the grains, and $j$ is a steam-pipe for admitting steam into the vessel at the center of the bottom $a$. $k$ is a steam-pipe surrounding the steam-jacket $a^2$ for the admission of steam at three equidistant points $k'$. $k^2$ is the exhaust-steam pipe, leading to a steam-trap or other device. K is a back-pressure valve for regulating the steam-pressure in the vessel A.

In Fig. 2 is illustrated a mashing apparatus similar to that shown in Fig. 1, and in which E is the agitating device, consisting of the driving-shaft $e$, extending from the top of the vessel A into the same, and is journaled at its lower end in the diametrical-disposed bar $e'$ and at its upper end in a bearing $a^3$. The diametrically-disposed bar $e'$ in this instance consists of the journal or cross-piece $e^2$, the pipes $e^3$, and end T-pieces $e^4$, and which may be adjusted by the set-bolts $e^5$, so as to exactly fit the inside diameter of the vessel A, for which it serves also as a stay. To this cross-bar $e$ are attached the stationary arms $e^6$ for a purpose to be hereinafter more fully described. $f$ is a revolving bar keyed or otherwise held to the shaft $e$, and consists of a hub $f'$, having sockets $f^2$, in which pipes $f^3$ of sufficient tensile strength are held by the set-bolts $f^4$. $f^5$ are scrapers located adjacent to the side walls of the mash-vessel A, and are disposed tangentially to the same, and which may be adjusted with reference to the side walls of the vessel A by the set-bolts $f^6$. $g$ are depending bars located near the center of the revolving bar $f$, and are connected by a stay $g'$, and each has at its lower extremity a scraper $g^2$. $g^3$ are intermediate bars disposed tangentially with reference to the circles in which they are located on the revolving bar $f$, and are provided with scrapers $g^4$ and $g^5$, the scrapers $g^5$ being in close proximity to the concave or conical bottom $a$. It will be understood from the drawings that these scrapers $g^5$ may be adjusted with reference to the bottom $a$ by moving the revolving bar $f$ toward or away from the same by the simple operation of shifting the collar $e^7$ on the shaft $e$.

In Fig. 3 is illustrated a mashing apparatus similar to those illustrated in Figs. 1 and 2, with the exception that the driving-shaft $e$ is extended into the vessel A from the bottom $a$ instead of from the top $a'$, as in Figs. 1 and 2, and which arrangement may be preferred where the power for driving the shaft $e$ and agitator E is located at the bottom or near the same. The intermediate bars $g^3$ are disposed at an angle, with reference to the shaft $e$, and four stationary arms $g^6$ are attached to the lower bearing $a^4$ in order to stir and mix the mash more thoroughly.

The operation of my improved mashing apparatus is as follows: A sufficient quantity of water is admitted to the vessel A by the pipe $a^5$ and the steam turned on in the pipes $k$ for the jacket $a^2$ in order to heat the water. The agitator E is now set in motion by power applied to the chain-wheel $i$, which drives the shaft $i'$ and bevel-gears $i^2$ and in turn the shaft $e$. Malt and other ingredients are now added to the water through the manhole C, and after a sufficient quantity is admitted the cover $c$ of the manhole C is closed. Steam is then directed into the vessel A by the pipes H and $j$ and the mashing process is in progress. The revolving bar $f$, together with the bars $g$ $g^3$, their scrapers $f^5$, $g^2$, $g^4$, and $g^5$, and stationary arms $e^6$, all of which are set at an angle with respect to their supports, enhance this process very materially and effectually, as they do not allow any clogging or piling of the mash in any part of the vessel A, but thoroughly agitate and stir the same. Moreover, the concave bottom $a$, or a conical one, if preferred, together with the agitator E, directs the mash and tends to give it a rolling motion, while the stationary arms $e^6$ break up any floating and clogging material or ingredients.

Having thus described the nature and object of my invention, what I claim as new, and desire to secure by Letters Patent, is—

1. In a mashing apparatus, a vessel having a concave bottom, in combination with an agitator comprising a driving-shaft journaled near one of its ends in a stationary cross-bar having arms and the other end of said shaft journaled outside said vessel, a revolving bar attached to said shaft and carrying at its respective extremities scrapers, and arms fastened on opposite sides to said revolving bar, certain of said arms carrying scrapers disposed adjacent to said concave bottom and having chains attached thereto, substantially as and for the purposes set forth.

2. In a mashing apparatus, a cylindrical vessel having concave bottom and cover, a steam-jacket around said vessel and located above said bottom, steam inlets and outlets provided on said vessel and jacket, and inlets and outlets provided in the concave bottom and cover for the ingredients or mash, in combination with an agitator comprising a driving-shaft extending half-way into said vessel and having one of its ends journaled in a bearing located outside the vessel and the other journaled in a bearing formed in a cross-bar within said vessel, said cross-bar carrying arms, a revolving cross-bar adjustably attached to said shaft and having at its respective ends scrapers located adjacent to the side walls of the vessel, and arms attached to opposite faces of said revolving bar, the arms above said bar disposed between the arms of the said arms on the said stationary cross-bar, and the arms below said revolving bar provided with scrapers disposed adjacent to the concave bottom and having chains attached thereto, substantially as and for the purposes set forth.

3. In a mashing apparatus, a cylindrical vessel having a depressed bottom and cover, an adjustable stay-bar for said vessel provided with adjustable stationary arms disposed at an angle to their support, an agitator comprising a driving-shaft journaled in said bar and in a bearing located outside said vessel and carrying a revolving bar provided at its ends with scrapers located in close proximity to the walls of said vessel, and arms attached to said revolving arm and having at their lower extremities scrapers adjacent to the bottom of said vessel, said arms and scrapers disposed at angles with respect to their supports, substantially as and for the purposes set forth.

In witness whereof I have hereunto set my signature in the presence of two subscribing witnesses.

ADAM C. WAGNER.

Witnesses:
SAMUEL L. TAYLOR,
HERMANN BORMANN.